United States Patent [19]
Appel et al.

[11] Patent Number: 5,539,441
[45] Date of Patent: Jul. 23, 1996

[54] JITTER REDUCTION IN AN OVERFILLED RASTER OUTPUT POLYGON SCANNER SYSTEM

[75] Inventors: James J. Appel; Susan E. Dunn, both of Rochester, N.Y.

[73] Assignee: Xerox Corporation, Stamford, Conn.

[21] Appl. No.: 149,356

[22] Filed: Nov. 9, 1993

[51] Int. Cl.$^6$ ...................................................... B41J 2/47
[52] U.S. Cl. ............................................ 347/134; 347/259
[58] Field of Search .................................. 347/255, 258, 347/259, 260, 261, 241, 134

[56] References Cited

U.S. PATENT DOCUMENTS

| | | | |
|---|---|---|---|
| 4,429,218 | 1/1984 | Thomas | 250/214 |
| 4,620,237 | 10/1986 | Traino et al. | 358/300 |
| 4,872,065 | 10/1989 | Isono et al. | 358/494 |
| 4,941,721 | 7/1990 | Banton et al. | 350/6.8 |
| 5,061,046 | 10/1991 | Lee et al. | 359/53 |
| 5,223,857 | 6/1993 | Loce et al. | 347/253 |
| 5,331,468 | 7/1994 | Noethen | 359/738 |

*Primary Examiner*—Mark J. Reinhart

[57] ABSTRACT

In an overfilled polygon ROS architecture, fast scan jitter is reduced by uniformly illuminating the overfilled facets. In one embodiment, the collimator lens is designed with a long focal length to transmit only the more uniform central portion of the Gaussian shaped intensity profile output of a laser diode. In another embodiment, the light level at the polygon facet is made uniform by introducing a variable transmission filter along the optical path.

2 Claims, 3 Drawing Sheets

JITTER REDUCTION IN AN OVERFILLED RASTER OUTPUT POLYGON SCANNER SYSTEM

BACKGROUND AND MATERIAL DISCLOSURE STATEMENT

The invention relates to a Raster Output Scanner (ROS) system having an overfilled facet design and, more particularly, to an improved optical system for reducing the polygon facet-to-facet fast scan jitter.

Digital printers incorporating Raster Output Scanners use a rotating polygon as the scanning element to form modulated scan lines on the surface of a photosensitive medium. In a typical system, a beam, modulated according to an input video signal, is emitted from a light source such as a helium neon or a diode laser. The modulated light is directed through pre-polygon conditioning optics, onto the facets of a rotating polygon. The polygon rotates in the 3 to 30 krpm range, thus scanning the beam through a post-polygon optical system and imaging the laser spot as a scan line across the full process width of a photosensitive medium moving in a process direction. In prior ROS systems there are typically two scanning modes. In a first mode, pre-polygon conditioning optics incorporate an underfilled design; e.g. the light from the laser is either collimated, in the case of a diode laser, or expanded in the case of a gas laser, and collimated to a beam width in the fast scan direction that is smaller than the polygon facet, typically by a factor of approximately 3. The underfilled design has been generally preferred because of a high throughput efficiency and uniform illumination of the imaging facet. A second mode is the overfilled design where the light beam is collimated (laser diode) or expanded (gas laser) to a beam width in the fast scan direction that is larger than the polygon facet by a factor of 3 or so in the fast scan direction. In an overfilled design, the facet size required to produce a given spot size at the image medium is greatly reduced allowing many more facets to be accommodated on the same diameter polygon. This, in turn, permits the scan system to form more scan lines per second with a given polygon motor, or, alternatively, to permit the use of less powerful and less expensive polygon motor drives. The overfilled design has several disadvantages which have heretofore not been completely resolved. The throughput efficiency is relatively low (20%), compared to the 50% efficiency of the underfilled design, and the illumination of the imaging facet is not as uniform as the underfilled design. This illumination problem has been addressed by the techniques disclosed in U.S. Pat. No. 4,941,721.

Another problem, one common to both underfilled and overfilled designs, is fast scan jitter manifested by pixel misregistration in scan lines formed in the fast scan direction at the image medium. The main cause is rotational or velocity variations in the polygon scanner. Additional contributing factors of lesser importance are misalignment of optical components, scan direction failures and pixel clock circuit failures. The jitter problem is exacerbated in color ROS printers which require that successively formed color images be superimposed to form a composite color image. Image to image registration tolerances are in the order of ±50 µm in the fast scan direction. Various prior art techniques are known to detect and correct fast scan jitter. U.S. Pat. No. 4,620,237 discloses a method for generating jitter correction signals by comparing peak to peak variations between integrated fast scan test signals. U.S. Pat. No. 4,429,218 discloses a scanning system which includes detection and signal comparison circuitry which enables synchronization of a scanning system relative to the power distribution within the scanning beam so as to align the information scanned on consecutive scan lines. Jitter correction is provided by varying the power level and focus of the scanning beam. U.S. Pat. No. 4,872,065 uses the Start of Scan (SOS) and End of Scan (EOS) sensors to determine an error time corresponding to a difference between a measured time interval and a reference time interval. Jitter is reduced by generating a dot recording clock signal frequency shifted in a predetermined direction. These prior art references are hereby incorporated by reference.

As mentioned above, the main factor contributing to jitter is velocity variations in the polygon scanner. In a paper by H. Horikawa, I. Sugisaki and M. Tashiro entitled "Relationship Between Fluctuation in Mirror Radius (within one polygon) and the Jitter", given at a SPIE meeting on Beam Deflection and Scanning Technologies in San Jose, Calif. from Feb. 25th to Mar. 1st 1991, and published in the proceedings of this meeting, the authors conclude that, in a polygon ROS system with an f-θ lens in the post-polygon optics (to focus the scanning beam in both directions), the only factor associated with the polygon geometry, contributing to jitter is the differential departure from flatness of the polygon facets. Stated alternatively, the magnitude of the jitter, in a polygon ROS with an fθ lens, is inversely proportional only to the uniformity of flatness of the polygon facets, from facet to facet. This conclusion also implies that a slight curvature in the facet surfaces does not give rise to jitter, if all the facets have the same curvature, but that a difference in curvature, from facet to facet, will cause jitter. It was perceived by the applicants that the magnitude of this effect was also inversely proportional to the uniformity of the illumination, in the fast scan direction, incident upon the polygon facet throughout its scan. By uniformity of the illumination is included the constancy of the location of the centroid of the illumination distribution relative to a coordinate system travelling with the facet, as well as the uniformity of the illumination distribution itself. That is, the more uniform the light incident on the polygon facet, in the fast scan direction, the smaller the magnitude of the jitter.

Thus, one method of reducing jitter is to make the illumination intensity distribution uniform in the fast scan direction at the polygon facet. An overfilled facet design presents a facet illumination requirement which differs from the underfilled design. Since the modulated beam has a Gaussian illumination intensity profile as the beam is expanded to overfill the facets, the amount of light reflected to the image medium varies because the polygon facets are sampling different portions of the Gaussian illumination intensity profile. One method of compensating for this facet-to-facet reflected light variation is to place an aspheric lens system in the pre-polygon optics and to change the Gaussian shape of the intensity profile of the modulated beams into a generally flat uniform intensity profile which overfills each facet. This technique is disclosed in U.S. Pat. No. 4,941,721. While not specifically discussing the effects on the reduction of jitter, this scanning system would inherently reduce jitter by creating a uniform intensity profile at the facets.

According to the present invention, two additional methods are provided for reducing jitter in an overfilled design. A first technique is to place a variable transmission filter in the optical path between the collimator lens which transmits the entire beam with its Gaussian illumination intensity profile and the polygon. The light transmission component smooths out or makes uniform the amount of light which is incident at the facet surface. The second technique is to use a collimator lens in the pre-polygon system which will transmit only a small portion of the output of a laser diode. The portion transmitted corresponds to the more uniform central portion of the beam with its Gaussian illumination intensity profile. More particularly, the present invention relates to an optical scanning system which reduces fast scan jitter in an overfilled polygon design comprising:

a source of high intensity modulated, polarized and collimated light beams having a Gaussian intensity profile, a polygon scanner having a plurality of light reflective facets interposed in the optical path between said light beam source and a light sensitive medium, optical means for fully and uniformly illuminating one of said facets to produce scanning beams which are reflected towards a light sensitive medium, while adjacent facets are at least partially illuminated and means for focusing said scanning beams reflected from said fully illuminated facet upon the surface of said light sensitive medium wherein said optical means includes means placed between said source and said scanner for varying the intensity profile of the collimated light beam.

DESCRIPTION OF THE INVENTION

Figure 1:
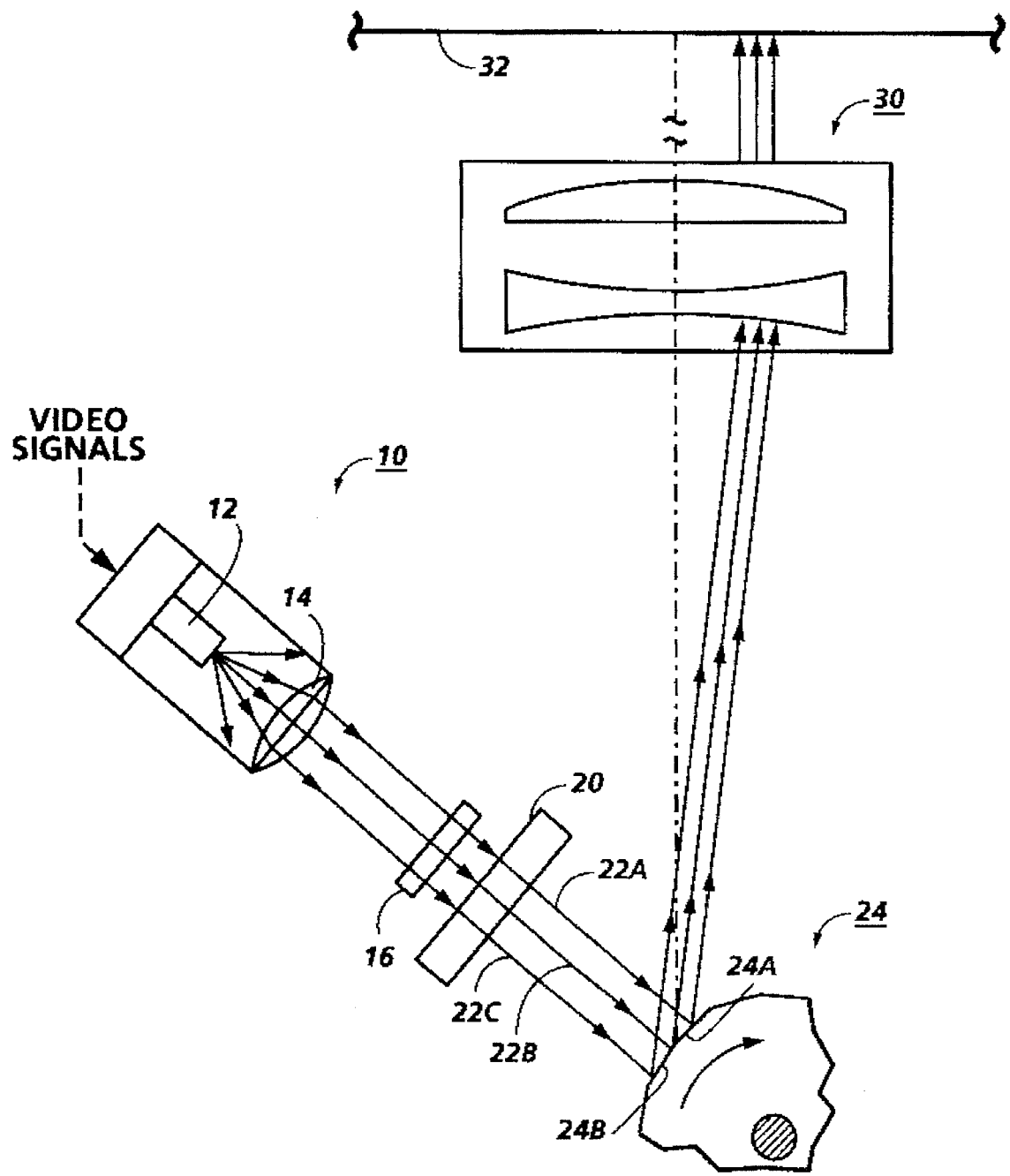
FIG. 1 shows a first embodiment of an overfilled polygon ROS system in the scanning plane utilizing a variable transmission filter in the optical path.

Referring to FIG. 1, there is shown a ROS system 10, having an overfilled polygon facet design. A laser diode 12 serves as the source of high intensity, polarized radiation. The laser diode 12 is self-modulating and the output beam of light is modulated in conformance with the information contained in input video signals. The modulated beam is collimated by collimator assembly 14. According to one aspect of the present invention, a variable transmission filter 16 which changes the Gaussian beam intensity profile to a uniform beam intensity profile is inserted in the collimated beam. The collimated uniform intensity beam has a width in the scan direction, which will overfill facets 24A and 24B. Rays 22A, 22B and 22C represent this overfilled beam. These rays pass through cylinder lens 20. Lens 20 shapes the collimated beam to make it optically correct to compensate for motor polygon induced sagittal beam position (wobble) error. Diode 12, collimator 14, lens 20 and variable transmission filter 16 form the pre-polygon optical system. The cylinder lens creates a focused beam in the plane of the vertical axis at the polygon, while maintaining the collimation of the beam in the perpendicular or scanning axis. Thus, a collimated light beam is directed across facets 24A, 24B of polygon 24, being rotated by a polygon motor 26. Facet 24A is shown for illustrative purposes as the imaging facet, while facet 24B is an adjacent facet. As the polygon rotates, a uniform beam of light is reflected from facet 24A and scanned through a post-polygon optical system which includes fθ imaging lens assembly 30. Lens assembly 30 includes, for example, either a toroidal f-θ lens (as shown) or a non-toroidal f-θ lens plus a cylinder mirror (not shown). Lens assembly 30 is designed to provide a linear relationship between the rotation of polygon 24 and the deflection of the scanned beam in the scan direction onto the surface of a photoreceptor 32 moving in a process direction. The post polygon optical system 30 focuses the reflected light in the fast scan and cross directions and provides wobble correction. Variable transmission filter 16 is designed to create a uniform illumination intensity profile in the fast scan direction on the scanning facet. Because the illumination intensity profile is uniform, facet to facet jitter is minimized.

As one example of a specific ROS system utilizing a variable transmission filter 16 which produces a uniform illumination profile, a diode laser with a full width at half maximum (FWHM) scan plane divergence angle of 33°, and a collimator lens of focal length of 38.1 mm produces a beam width of 22.5 mm at polygon 24. This beam has a Gaussian illumination intensity profile in the scan direction with an intensity at the edge which is 0.5× the intensity at the center. Filter 16 is designed to transmit more light to the facet edges so as to obtain beam with an intensity profile which is the same at the edge of the beam as at the center. Alternatively, filter 16 could be replaced with a variable transmission liquid crystal apodizer. Polygon 24 has 18 facets with each facet having a surface flatness of Λ/3 (where, in this case, Λ is in wavelengths of 674 nm light). This system has a total conjugate of 924.8 mm. Jitter in the fast scan direction is only 11.4 μm. This jitter is greatly reduced from the prior art systems without a variable transmission filter where the intensity at the edge of the beam is 0.5× the intensity at the center of the beam, as demonstrated in Table 1. Table 1 lists several beam intensity profiles from 0.5× intensity at the edge of the pre-polygon beam relative to the intensity at the center of the pre-polygon beam to completely uniform, 1×, illumination across the pre-polygon beam, versus the amount of jitter for various degrees of facet flatness.

TABLE 1

| Jitter vs. Facet Flatness for Overfilled Beams of Varying Uniformity | | | |
|---|---|---|---|
| PRE-POLYGON BEAM INTENSITY PROFILE Overfilled; beam width = 22.5 mm | Jitter in μm for facet flatness of λ/2 | Jitter in μm for facet flatness of λ/3 | Jitter in μm for facet flatness of λ/4 |
| gaussian illumination Intensity at outside edge of facet at SOS & EOS = 0.5 × intensity at center of pre-polygon beam PUI = 0.5 | 51.2 | 25.8 | 17.6 |
| gaussian illumination Intensity at outside edge of facet at SOS & EOS = 0.6 × intensity at center of pre-polygon beam PUI = 0.6 | 47.1 | 22.1 | 14.7 |
| gaussian illumination Intensity at outside edge of facet at SOS & EOS = 0.7 × intensity at center of pre-polygon beam PUI = 0.7 | 43.5 | 19.0 | 12.2 |
| gaussian illumination Intensity at outside edge of facet at SOS & EOS = 0.8 × intensity at center of pre-polygon beam PUI = 0.8 | 40.3 | 16.2 | 9.9 |
| gaussian illumination Intensity at outside edge of facet at SOS & EOS = 0.9 × intensity at center of pre-polygon beam | 37.5 | 13.7 | 7.9 |

TABLE 1-continued

Jitter vs. Facet Flatness for Overfilled Beams of Varying Uniformity

| PRE-POLYGON BEAM INTENSITY PROFILE Overfilled; beam width = 22.5 mm | Jitter in μm for facet flatness of λ/2 | Jitter in μm for facet flatness of λ/3 | Jitter in μm for facet flatness of λ/4 |
| --- | --- | --- | --- |
| PUI = 0.9 uniform illumination PUI = 1.0 | 34.8 | 11.4 | 6.1 |

Figure 2:
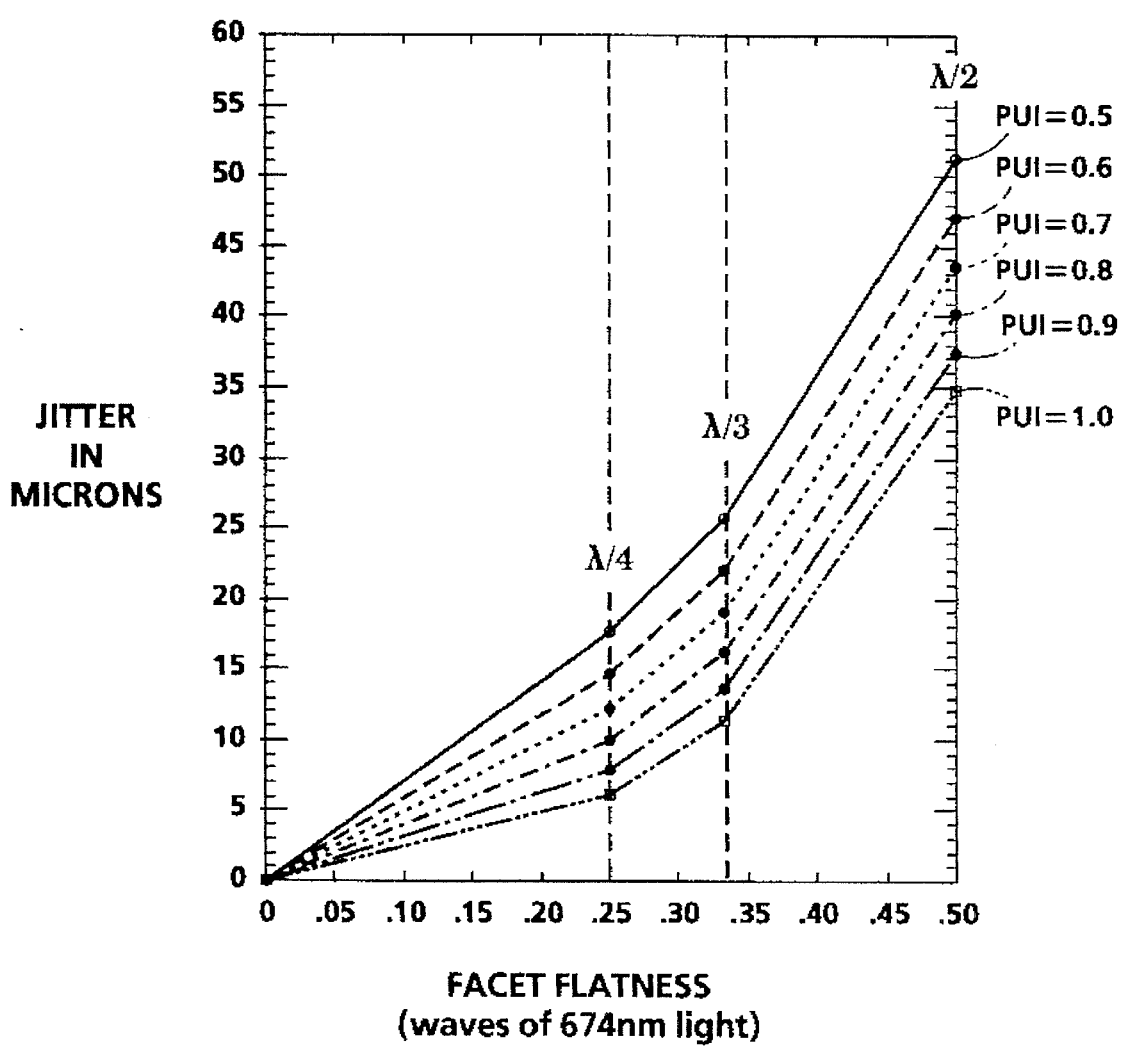
FIG. 2 shows the relationship between jitter and the flatness of the polygon facets.

FIG. 2 shows in graphical form the relationship between jitter, facet flatness, and facet illumination uniformity for the six overfilled beam illumination intensity profiles set forth in Table 1. The PUI values represent the ratio of the intensity at the edge of the pre-polygon beam to the intensity at the center of the pre-polygon beam. It is noted that, for example, to obtain jitter of less than 17.6 m with PUI=0.5 system, a stringent surface flatness of λ/4 is required. The surface flatness requirements can be reduced to λ/3 in the uniform illumination example, with PUI=1.0, while reducing the jitter to 11.4 μm, thereby both reducing the cost of making the polygons and improving the quality of the ROS. Another advantage of the uniform illumination is the reduction or elimination of the need for photoreceptor illumination correction referred to in the art as "smile" correction.

Figure 3:
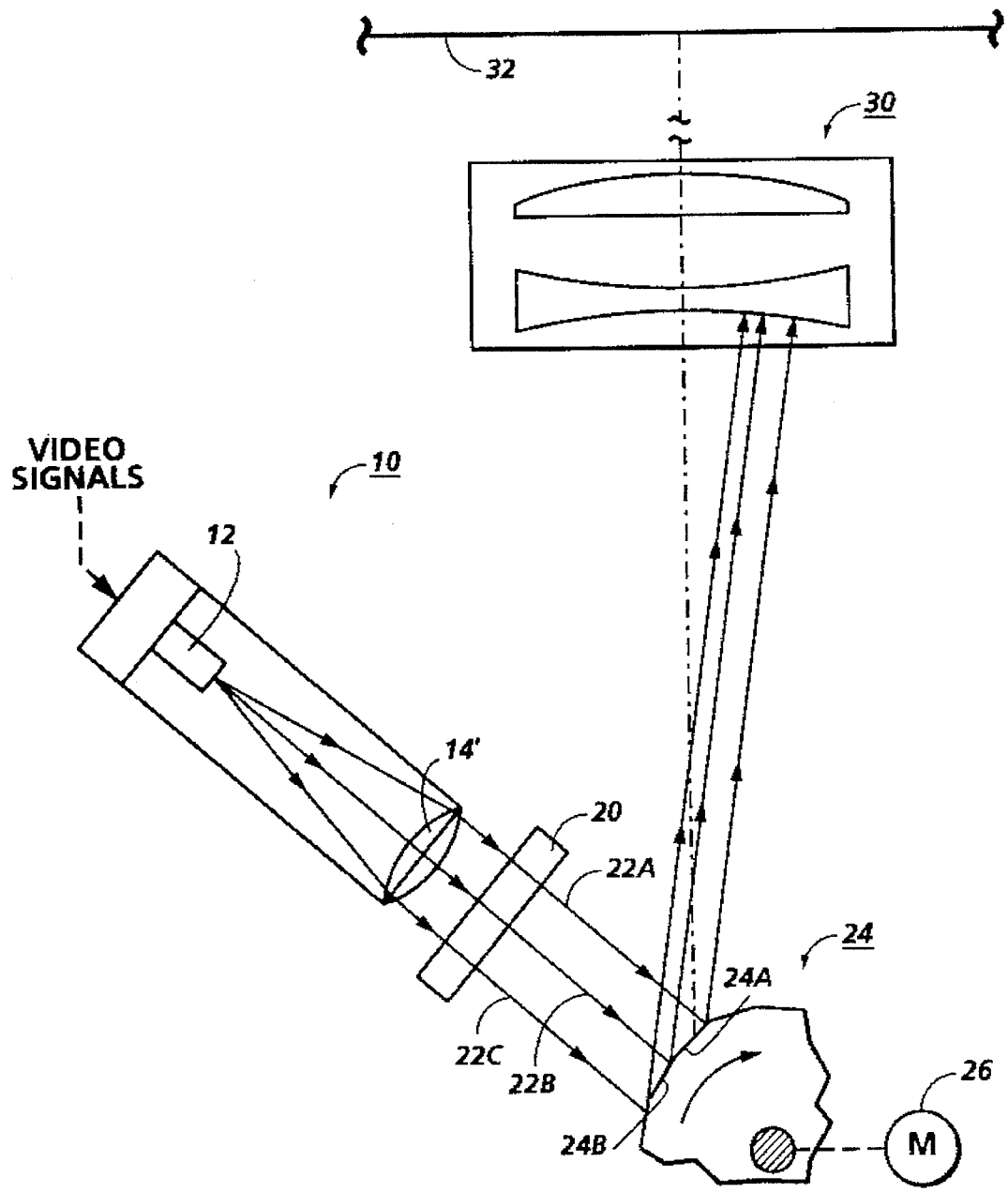
FIG. 3 shows a second embodiment of an overfilled polygon ROS system in the scanning plane utilizing an improved collimator lens.

Referring to FIG. 3, and according to a second aspect of the invention, nearly uniform facet illumination is obtained at the polygon facet in the scan direction in an optical system by using a collimator 14' which has a focal length longer than the conventional collimator 14 shown on FIG. 1. Collimator 14' produces a nearly uniform beam illumination profile at the facet by passing only the central portion of the pre-polygon beam with Gaussian illumination intensity profile emitted by laser 12. The light which is not passed by the collimator aperture is directed out of the optical system. In the optical system which was used for the calculations in the Table, with a laser diode with a FWHM divergence angle of 33° in the scan direction, a collimator 14' with a focal length of 97.7 mm will create an illumination intensity distribution in the scan direction at the polygon facet which has an intensity at the edge which is 0.9×the intensity at the center. From Table 1, this longer focal length collimator will reduce the facet to facet jitter, with a facet flatness of λ/3, to 13.7 μm. It should be understood that such a longer focal length collimator will reduce the throughput efficiency of the optical system, and will thus require the laser diode to operate at a higher power level.

While the embodiments disclosed herein are preferred, it will be appreciated from this teaching that various alternative, modifications, variations or improvements therein may be made by those skilled in the art, which are intended to be encompassed by the following claims.

We claim:

1. An optical scanning system for reducing fast scan jitter in an overfilled polygon design comprising:

a source of high intensity modulated light beams having a Gaussian intensity profile, a polygon scanner having a plurality of light reflective facets interposed in the optical path between said light beam source and a light sensitive medium, optical means for fully and uniformly illuminating one of said facets to produce scanning beams which are reflected towards a light sensitive medium, while adjacent facets are at least partially illuminated, and means for focusing said scanning beams reflected from said fully illuminated facets upon the surface of said light sensitive medium, and wherein said optical means includes a collimator lens between said source and said polygon, said collimator lens having a focal length which collimates only a central portion of the beams with Gaussian intensity profile.

2. A method for reducing jitter in an overfilled polygon ROS system including the steps of:

generating a high intensity modulated light beam, said light beam having a Gaussian intensity profile, transmitting and collimating a central, more uniform portion of said Gaussian shaped intensity profile light beam along an optical path, focusing said collimated light beam onto the facets of said polygon so as to overfill successive scanning facets with a uniform illumination profile beam, and focusing the beam reflected from said facets onto the surface of a light sensitive medium.

* * * * *